Nov. 27, 1934.   O. WOLFF   1,981,889
MOLDING RECTANGULAR BONED MEAT
Filed July 29, 1931
Fig. 1.
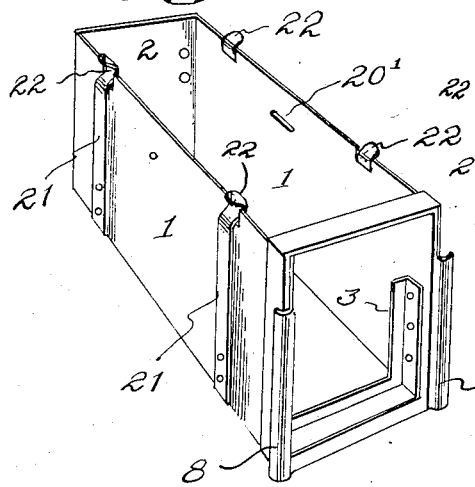
Fig. 2.
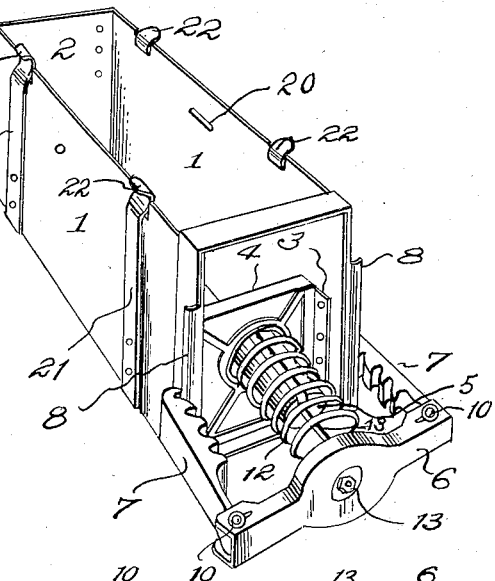
Fig. 4.
Fig. 3.
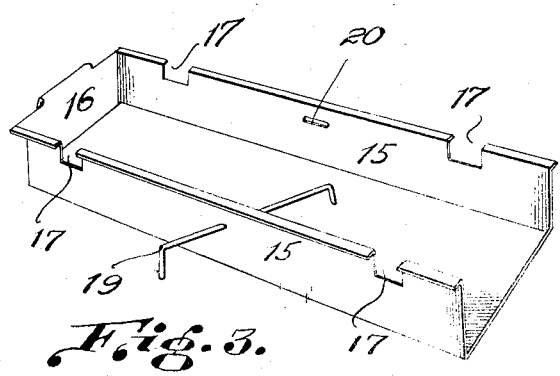
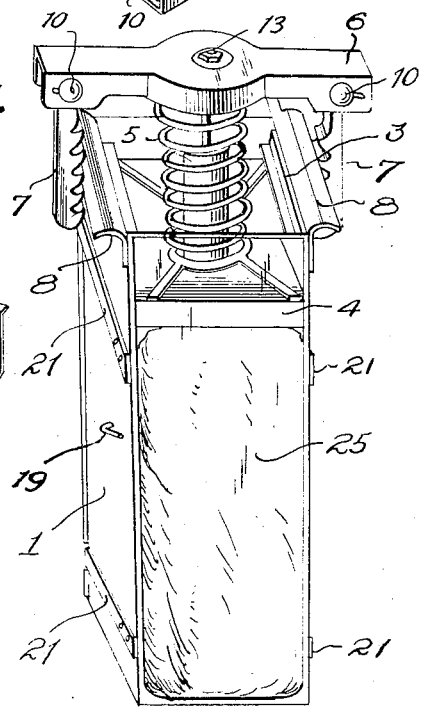
INVENTOR.
Oscar Wolff
BY J. T. Newton
ATTORNEYS.

Patented Nov. 27, 1934

1,981,889

UNITED STATES PATENT OFFICE 1,981,889

MOLDING RECTANGULAR BONED MEAT

Oscar Wolff, Chicago, Ill.

Application July 29, 1931, Serial No. 553,851

5 Claims. (Cl. 100—57)

This invention relates to an apparatus and process for treating hams or shoulders and has for its object the forming and placing under extra heavy pressure the meats after they have been boned and then releasing the heavy pressure and cooking the meats under moderate spring pressure.

Another object of the invention is to impart to the boned meat a rectangular form so that slices of meat adapted for use in making sandwiches may be neatly cut into attractively thin, square shaped slices.

Another object of the invention is to prevent waste by subjecting the boned meat to sufficient pressure to distribute the fatty portions and simultaneously shape the natural, irregular form to conform with the rectangular portion walls of the mold.

Another object of the invention is to produce an apparatus for carrying out the process in the most expeditious manner, the apparatus being adapted to receive the boned ham and to apply pressure first sideways of the ham or shoulder and then endways so as to produce a rectangular shaped mass.

In carrying out my invention I may use a press substantially the same as shown in my Patent No. 1,388,082, August 16, 1921, with slight modifications to adapt it to my improved process.

The details of my mold are shown in the accompanying drawing in which:

Figure 1 is a perspective view of the mold without the cover.

Figure 2 is a view of the mold having a follower therein to press the meat endways.

Figure 3 is a perspective view of the top of the mold, and

Figure 4 is a view of the mold standing upright with the bottom off.

The mold has sides 1—1 and one end 2. It is partially open at the other end with an angle iron 3 partially crossing this end. Inside the angle iron is a follower or piston 4 and extending from the follower is a stem 5. At the outer end of the stem I provide a cross-head 6 having hinged thereto two racks 7—7 in slotted openings which will take care of different sized ham molds.

The mold may have an out-turned flange 8 and when the mold is turned endways in the press the press follower may be forced down on the cross-head 6 to force the follower against the meat, as shown in Figure 4, and compress the same as much as desired. The racks 7, pivoted at 10, will pass down over the flanges 8 and the teeth of the racks will pass under the edge of the flange and by reason of the shape of the teeth will catch under the flange when the meat expands and hold it practically to the limit of inward pressure.

The stem 5 extends from the follower 4 and is slotted, as shown, and surrounded by a strong spring 12. A bolt 13 passes through the cross-head 6 and down through the slot in the stem 5 to provide a device wherein there is a short lost motion between the cross-head 6 and the follower 4 so that when pressure is exerted on the cross-head 6 it first puts the spring 12 under compression and then forces the follower 4 down on the meat. The follower is held in its compressed position by the racks 7—7. The follower resting on the inside of the angle iron 3 may be normally held in the mold. I provide a side of the mold that is detachable. This detachable side cover is illustrated in Figure 3 and comprises sides 15 and an end 16 being open at the other end. I prefer to provide notches 17—17 in the sides 15 and a rod 19, shaped as shown, which passes through one side and is retained normally therein by the bent end of the rod but when the side cover is placed in the mold 1, a rod 19 may be passed through a slot 20 in the side of the cover and thence through a corresponding slot 20' in the mold to hold the cover in the mold.

I also provide upright spring pieces 21 fastened at their lower ends to the sides of the mold and with hooked heads 22. When the side cover is placed in the mold, the hooked end of the spring pieces 21 catch in the notches and hold the cover in the mold.

Having now described the details of the structure of my mold, the operation of it is as follows:

The ham or shoulder, having been boned, is placed in the mold 1. The mold may be of several standard sizes to fit different size hams or shoulders. The mold without the side cover, having the meat therein, is placed in a press substantially like the one shown in my prior patent and the meat is compressed as much as desired. The press follower is then raised and the side cover attached to the mold, also the follower attached and fitted inside the angle iron 3, as shown in Figure 2. After the side cover is put over the previously pressed meat, the press follower is again run down on the side cover and the meat given any desired pressure and after the follower is raised the rod 19 is inserted in the slots 20, 20' and with the hooked uprights 21 holds the side cover firmly in place. The spring hooks 22 catch in the notches 17 and will ordinarily hold the side cover in place, but out of abundant caution I provide the rod 19, as shown in Figure 3, which when passed through the slots 20, 20' securely holds the side cover in place.

The mold is then turned to the position shown in Figure 4 and the follower forced down on the meat 25 in the mold to any desirable pressure. The follower is held in its pressed position by means of the racks 7—7 and with the parts as shown the meat may then be cooked under pressure of the spring 12.

It is apparent that my process will produce a rectangular loaf into which the shank ends are pressed to the inside of the ham and these shank ends will slice the same as any other part of the ham or shoulder, thereby eliminating considerable waste.

After the operations before set forth, the ham and mold are ready for the cooking operation. Steam or hot water is applied for a certain length of time and the ham mold with the ham therein is taken out and placed in a freezer for approximately twenty-four hours to give the ham a chance to chill in the can and the ham will chill to take on the rectangular form of the interior of the mold.

What I claim as my invention is:

1. A mold for producing a rectangular mass of meat from a boned ham or shoulder, said mold having one side detachable and a detachable end comprising a follower movable in the mold to press the meat, means on the interior of the end of the mold to normally keep the follower in the mold, flanges on the exterior of the mold, toothed racks cooperative with the flanges, a cross-head to which the racks are hinged and a spring between the cross-head and follower.

2. A mold for cooking meat having at one end a follower, an angle iron ledge on the interior of the mold and against which the back of the follower normally rests, flanges on the exterior of the mold, and racks cooperative therewith, a cross-head to which said racks are pivoted at their outer end and a spring between the cross-head and follower.

3. A ham mold comprising a bottom, two sides and an end permanently attached to each other, one side of the mold being detachable therefrom, the detachable side of the mold comprising a bottom and upstanding sides, the upstanding sides being adapted to telescope the sides of the mold and means for holding the telescoped parts in position to close a side of the mold, a follower in one end of the mold having a post and a cross-head normally spaced from the end of the post and a spring interposed between the cross-head and the follower.

4. A mold having three sides attached to each other and a covering for another side of the mold, said covering having upstanding sides adapted to be telescoped and pressed sidewise between two of the other sides to contract the mold sideways, a follower in one end of the mold to press the meat endwise, said follower having a post attached thereto and a rod extending into the post and carrying a cross-head, and a spring interposed between the cross-head and follower.

5. A meat mold comprising three sides and an end attached to each other, a follower in the open end and one side of the mold being detachable from said three sides and end and movable inwardly to contract the mold sidewise, a spring on the follower, a cross-head and means on the sides of the mold for holding the spring compressed against the follower when the follower is forced into the mold.

OSCAR WOLFF.